Patented Nov. 21, 1922.

1,436,289

UNITED STATES PATENT OFFICE.

HERMANN PLAUSON, OF HAMBURG, GERMANY.

PROCESS AND APPARATUS FOR EXTRACTION OF CARBONACEOUS SUBSTANCES OR HYDROCARBONS.

No Drawing.   Application filed January 13, 1921.   Serial No. 437,116.

*To all whom it may concern:*

Be it known that I, HERMANN PLAUSON, Esthonian subject, residing in Hamburg, Germany, have invented certain new and useful Improvements in Processes and Apparatus for Extraction of Carbonaceous Substances or Hydrocarbons (for which I have made application in Germany, April 23, 1918), of which the following is a specification.

It is known that liquid sulphur dioxide can be used to extract soluble matter from the most varied types of coal and mixtures of saturated and unsaturated hydrocarbons can be separated by extraction in this way. This process is very difficult since the gas boils about −8 to −10° C., and special apparatus is necessary to transform the gaseous sulphur dioxide into the liquid state and to maintain it in this state.

The present invention relates to a new process and apparatus which allows extraction with sulphur dioxide to be performed at ordinary temperatures and under pressure which is very useful in practice.

The invention is based on the discovery that the extraction process gives an equal and in certain cases a greater yield if a mixture of sulphur dioxide with ketones is used instead of pure sulphur dioxide. For example with liquid sulphur dioxide it is only possible to extract a portion of the hydrocarbons present in the coal and by addition of acetone other constituents can be extracted.

Since mixtures of acetone and sulphur dioxide have not been used for extraction hitherto, it was not known whether they would give the same result as liquid sulphur dioxide or not. As the result of experiments however it has been ascertained that admirable results are obtained with this mixture and also with mixtures of sulphur dioxide with higher ketones such as methyl ethyl ketones, diethyl ketone, methyl propyl ketone, ethyl propyl ketone, etc.

It was not known that the higher ketones of the aliphatic series were capable of absorbing sulphur dioxide in this manner. Further it was not known that acetone or mixtures of acetone with the above mentioned ketones would absorb sulphur dioxide to such an extent as would make it possible to employ the mixture for technical purposes nor was it known under what conditions such a mixture would be suitable in practice.

Still less could it have been foreseen that a mixture of ketone and sulphur dioxide could be used not only for the separation of unsaturated from saturated hydrocarbons but also for the extraction of coal.

It has been discovered that the extraction and absorption of unsaturated solid, liquid or gaseous hydrocarbons proceeds even at atmospheric temperatures and with a considerably higher yield when pressure is used. The application of higher pressure is particularly important for the extraction of all kinds of coal.

Example 1.

A bomb tube is filled with 600 gr. of acetone and then about 650–700 gr. of sulphur dioxide are passed in between 0° and 15° C. The volume of the liquid increases by about one half. To this liquid is now added about 1000 gr. of good hard coal in pieces the size of a pea and the mixture is allowed to stand at atmospheric temperatures (20° C.) for about 5–10 hours. After this time the bomb is cooled to 0° C. and opened. The whole liquid has disappeared, the coal has disintegrated and increased in volume by about one half. By addition of sufficient quantities of acetone or hydrocarbons or fresh quantities of the sulphur dioxide acetone mixture, the acetone sulphur dioxide excess is completely removed from the coal. A dark red extract is obtained which shows no particular fluorescence and becomes reddish yellow on dilution. The extraction is continued till the extracted liquid is colourless. To concentrate the extract it can be employed for the extraction of further quantities of coal and then distilled. The sulphur dioxide evolved in distillation is at once cooled by water or ice and then again absorbed by acetone and used again. The yield in this example amounts to about 1% of the coal employed and consists of a reddish oily liquid which gives a yellow oily hydrocarbon by distillation with superheated steam and neutralization by weak soda alkali solution.

The process can be modified by first adding acetone to the coal and then passing sulphur dioxide into the mixture.

If the acetone and gas is cooled to 0° to —8° C., almost a double quantity of sulphur dioxide can be absorbed by the same quantity of acetone, but in this case obviously the temperature of the surroundings must be low. If the absorption takes place in open vessels, a higher boiling ketone must be used. The evaporation of the sulphur dioxide can be prevented by using higher homologues of acetone, but the yield is very small about 1%.

It has been found that the yield can be considerably increased by extracting the coal under pressure.

*Example 2.*

An autoclave provided with a cooling jacket and having stout walls is charged as in example 1 with 1 kg. of the same hard coal and 1.2 to 1.5 kg. of the acetone sulphur dioxide mixture. The lid is hermetically closed and the autoclave connected with a nitrogen or hydrogen bomb and the gas admitted at ordinary temperatures to give a pressure up to 70 atmospheres. The autoclave can be cooled during or after the reaction which lasts for three to four hours. The operation is then conducted as in example 1 when the same product is obtained but in a yield of up to 4.8%. Presumably the yield would be still further increased by raising the pressure further.

*Example 3.*

The operation as described in example 2 is modified in that the extraction is performed for a different time with larger quanities of acetone sulphur dioxide mixture and the liquid forced into the layer of coal under extraction from below to above by means of a compressor through a non-return valve so that the extraction liquid can flow out through an upper externally adjustable safety valve which can be set to allow of the liquid to escape at any desired pressure. In such manner the liquid can be continuously circulated through the coal by the compressor at any desired pressure.

The whole system of compressors, autoclaves and reservoirs can form a closed system which is preferable for operations on a technical scale.

*Example 4.*

The apparatus, process and proportions are the same as in example 2 but lignite or bituminous brown coal is employed instead of hard coal.

If now the acetone sulphur dioxide mixture is distilled as in example 1, an oily liquid product is not obtained but a resinous or wax-like substance with an average yield of 20-23% of the coal employed. Without using pressure the yield is only about 10-15%. The mixture of acetone and sulphur dioxide is of particular value for the extraction of lignite since a simultaneous double action takes place, in which the sulphur dioxide acts on the coal and the ketone dissolves the resinous substances. It is due to this double action that even at ordinary temperature and pressure a higher yield is obtained than in the case with extraction by benzene or the like substances in a Soxhlet apparatus in the laboratory.

In addition to coal, other solid hydrocarbons of various kinds can be treated in the same way to separate the unsaturated from the saturated portions by extraction.

By using the higher homologues of acetone the operation is facilitated and made more certain since these substances retain the sulphur dioxide at normal atmospheric temperature and do not easily evaporate themselves.

Instead of treating pure coal (lignite) it is frequently advisable to treat the material previously with alcoholic or aqueous caustic alkali liquor in some cases under a pressure for example of 5-10 atmospheres and then to evaporate the water or alcohol; the treatment of the material can then be effected according to examples 1 or 3. In this process the yield is increased to 34-36%. In this case several per cent of liquid hydrocarbons are obtained and more substances resembling mineral wax.

The process is applicable not only for the extraction of coals of all kinds but also for separating unsaturated from saturated hydrocarbons by extraction as illustrated in the following example.

*Example 5.*

100 parts of crude naphtha are extracted with a mixture consisting of 60 parts of acetone and 60-70 parts of sulphur dioxide at a temperature of 0 to 15° C. and allowed to stand with efficient agitation in an open or closed vessel. Two layers are formed, one coloured and the other more or less clear. After separation of these layers in a separating apparatus, the clear layer can be further extracted with fresh quantities of the mixture of acetone and sulphur dioxide and after this second extraction, it is obtained clear and pure.

The unsaturated hydrocarbons can be recovered by distillation of the acetone sulphur dioxide mixture.

The unsaturated hydrocarbons can be separated from the distillation products of lignite in the same way as above since paraffin hydrocarbons are not dissolved by the acetone sulphur dioxide mixture. Other oils containing saturated and unsaturated hydrocarbons can be treated in the same way.

The mixture of acetone and sulphur dioxide can be employed as a useful absorption liquid for various purposes as illustrated in the following example.

*Example 6.*

In manufacturing diolefine hydrocarbons of all kinds, it is important to separate them from other hydrocarbons or gases. It has been found that by using a mixture of acetone and sulphur dioxide as absorption medium, the diolefines alone are absorbed with a very good yield while other hydrocarbons and saturated gases such as methane are hardly absorbed at all. Acetylene and acetylene hydrocarbons are likewise dissolved very little.

It is known that acetylene is vigorously absorbed by acetone and it is remarkable that a mixture of acetone and sulphur dioxide (saturated with sulphur dioxide) only dissolves very small quantities of acetylene, but that this mixture is a very good solvent for diolefines with which it forms an addition product which can be filtered off as a precipitate from which the diolefine hydrocarbons can be again obtained by heating. This provides a simple and smooth process to separate diolefines from other bodies by simple absorption which can be effected in open vessels at ordinary atmospheric pressure which is an important advantage.

It has been proposed to prepare compounds of sulphur dioxide with unsaturated hydrocarbons of the diolefine series. By using sulphur dioxides in the gaseous form or in aqueous solution, the results of the present invention are not obtained since water does not dissolve sulphur dioxide to the same extent as for example acetone, which readily dissolves over 100% so that sulphur dioxide gas or aqueous solutions thereof do not exert the same highly concentrated action on the diolefines as is possible with mixtures of acetone and sulphur dioxide. But this concentrated action is extremely important if the gas is to be collected by continuous absorption. This is not possible in aqueous solutions as room temperatures and water is unsatisfactory in the case of diolefines. The action of sulphur dioxide in aqueous solution only takes place with diolefines if the mixture is continuously stirred.

By using acetone or ketones and sulphur dioxide jointly, it is possible to obtain the unexpected result that the absorption takes place continuously at ordinary atmospheric pressure and that the reaction is possible on the large scale. In some cases the acetone appears to crystallize out with the diolefine sulphur dioxide compound instead of water of crystallization when a still better yield is obtained.

It will be clear that the invention includes the treatment of the specified materials by mixtures of sulphur dioxide and ketones but provided that the joint action of these reagents is obtained they may be applied consecutively. For instance the material may be treated with sulphur dioxide and then extracted with acetone or the material may be treated with acetone and sulphur dioxide may be added to the mixture.

Having now particularly described and ascertained the nature of my said invention and in what manner the same is to be performed, I declare that what I claim is:—

1. Process for the treatment of solid carbonaceous materials containing constituents which are capable of extraction by sulphur dioxide in which a solution of sulphur dioxide in a ketone is used for extraction.

2. Process for the treatment of materials containing constituents which are capable of extraction by sulphur dioxide in which the materials are treated with a concentrated solution of sulphur dioxide in a ketone.

3. Process for the treatment of materials containing constituents which are capable of extraction by sulphur dioxide in which the materials are treated with a concentrated solution of sulphur dioxide in a ketone without substantial cooling.

4. Process for the treatment of solid carbonaceous materials containing constituents which are capable of extraction by sulphur dioxide in which a solution of sulphur dioxide in acetone is used for extraction.

5. Process of the treatment of materials containing constituents which are capable of extraction by sulphur dioxide in which sulphur dioxide and a ketone are jointly used for extraction under pressure.

6. A process of treating coal which consists in treating coal with alkali solution under pressure and then extracting the product with sulphur dioxide and a ketone.

7. A process of separating unsaturated from saturated hydrocarbons by extraction with a solution of sulphur dioxide in a ketone.

8. A coal extract consisting of a mixture of both ketone-soluble coal constituents and coal constituents soluble in sulphur dioxide.

9. A coal extract consisting of a mixture of both acetone-soluble coal constituents and coal constituents soluble in sulphur dioxide.

In witness whereof, I have hereunto signed my name this 30 day of December 1920, in the presence of two subscribing witnesses.

HERMANN PLAUSON.

Witnesses:
 HECTOR ARMSTRONG,
 W. H. BEESTON